Nov. 4, 1958

P. E. PATCHIN 2,859,270

TELEPHONE AND TELEGRAPH CABLE BREATHER

Filed Aug. 10, 1953

INVENTOR.
Paul E. Patchin
BY
ATTORNEY.

United States Patent Office 2,859,270
Patented Nov. 4, 1958

2,859,270
TELEPHONE AND TELEGRAPH CABLE BREATHER

Paul E. Patchin, Kansas City, Kans., assignor of one-twentieth to Mike W. Nicholson and one-twentieth to Carl W. Nicholson, both of Kansas City, Kans.

Application August 10, 1953, Serial No. 373,081

6 Claims. (Cl. 174—16)

This invention relates to the provision of a structure for use in connection with conductor cables having a plurality of insulated wires therein, such as telephone lines, to prevent shorting of the wires due to moisture drawn into the cable through small cracks and crevices that form in the cable after a period of time, and which moisture reaches the interior of the cable through the action of a vacuum created in the cable in response to temperature changes and/or barometric pressure variations.

Telephone companies particularly have heretofore experienced great difficulty with the problem of wet cables which causes shorting of one or more pairs of the wires in the cable, necessitating a time-consuming location of the trouble and an expensive repair operation. The difficulty continues throughout the year in all localities and appears to vary in frequency of occurrence more in proportion to changes in temperatures and/or barometric pressure than to varying conditions of rainfall.

I have discovered that the cause of the difficulty lies in pressure changes within the cable which develops a suction therewithin that in turn draws moisture into the cable through very fine cracks and crevices existing in the cable and which would normally repel the flow of moisture into the cable and around the insulated wires therein contained.

In accordance with my present invention therefore, there is provided means to permit the cable to "breathe" and thereby draw in dry air and expel the same through a path of least resistance rather than through the cracks and crevices of the cable which form therein as the cable ages and which condition cannot practically be prevented.

It is accordingly, the most important object of the present invention to provide a breather for cables in the nature of a hollow, perforated body attached to the cable and communicating therewith for passage of air into the cable as a suction is developed therewithin.

Other objects include the way in which the breather is provided with moisture-absorbing means taking the form of an elongated pad in the body; the manner of providing a perforated restriction within the body to limit the amount of air flowing into the body so that the structure may be mounted on a sleeve; the way in which a foraminous insect bar is provided in the breather body; the way in which the said bar is disposed at an angle so as to drain any moisture collection therefrom; and many additional objects including important details of construction, all of which will be made clear or become apparent as the following specification progresses.

Figure 1:
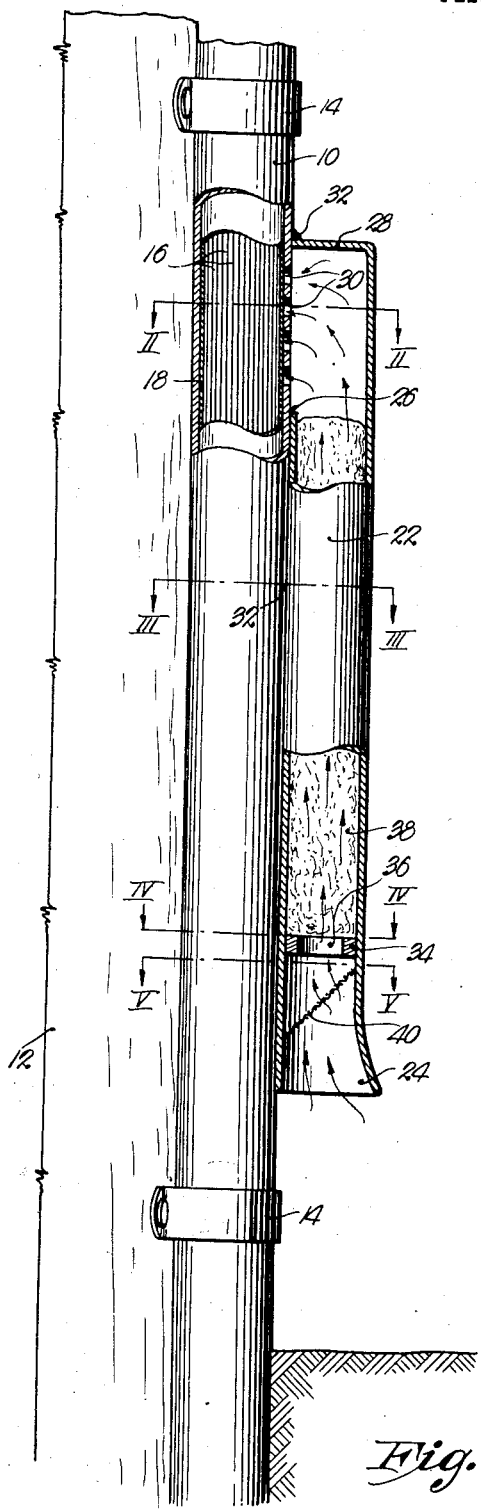
Figure 1 is an elevational view of a telephone and telegraph cable breather showing the same operably mounted upon a cable that is in turn connected to a pole or other support, parts being broken away and in section to reveal details of construction.
Figure 2:
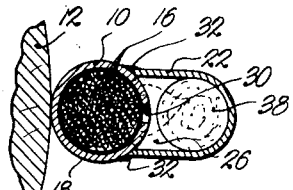
Fig. 2 is a cross-sectional view taken on line II—II of Fig. 1.
Figure 3:
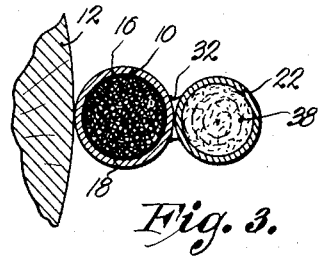
Fig. 3 is a cross-sectional view taken on line III—III of Fig. 1.
Figure 4:
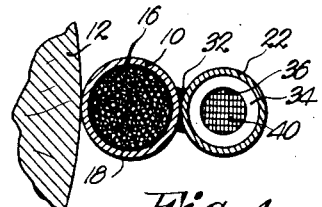
Fig. 4 is a cross-sectional view taken on line IV—IV of Fig. 1.
Figure 5:
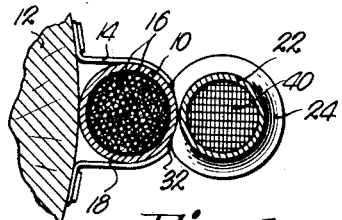
Fig. 5 is a cross-sectional view taken on line V—V of Fig. 1.

In Figs. 1 to 5 inclusive of the drawing, there is illustrated a conductor cable 10 such as those used in telephone and telegraph systems, mounted upon a pole 12 or other support through the medium of brackets 14. Cable 10 is conventionally provided with a plurality of insulated wires 16 that are in turn encased within a paper lining 18.

Figure 6:
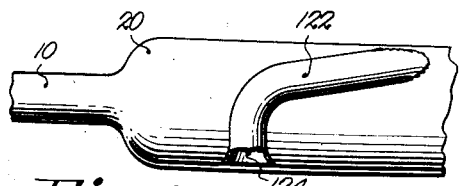
Fig. 6 is a fragmentary, elevational view showing the manner in which the breather may be formed for mounting upon a sleeve or upon the cable itself when the latter is disposed horizontally.

As above explained, cables 10, usually made from lead, develop relatively small and oftentimes microscopic cracks and crevices therein, which, by their very minuteness, are normally capable of repelling the flow of moisture of sufficient quantity to permeate the liner 18, and the insulation of the wires 16 so as to cause shorting of one or more pairs of the wires 16. However, the pressure of the air within the cable 10 undergoes continual change as temperatures and/or barometric pressure rise and fall, creating a vacuum or suction within the interior of the cable 10 of sufficient force to draw or suck moisture thereinto through such minute cracks and crevices. The result of this action is oftentimes detrimental to the extent of wetting the wires 16 and causing the same to short. Once the moisture begins to flow into the cable 10 and permeate the paper 18, as well as the insulation of the wires 16, the entire bank of wires oftentimes become completely shorted in a relatively short period of time. Even if but one pair of the wires are thus rendered defective, it becomes necessary for the telephone company to first locate the point of trouble through use of instruments designed for the purpose and through a time-consuming procedure. Thereupon, the cable 10 must be cut, the repair made and the cable spliced by means of a sleeve 20 such as shown in Fig. 6 of the drawing.

Manifestly, such procedure is extremely expensive to the company, requiring crews subject to call at any time day or night, and oftentimes service is disrupted for a considerable period of time before the difficulty can be located and rectified in the manner just described.

The structure herein contemplated for eliminating the problem is in the nature of a hollow body, broadly designated by the numeral 22 in Figs. 1 to 5 inclusive. Body 22 may be made from any suitable material such as lead, copper or the like, and is provided with an inlet opening for free passage of air thereinto. In the form of my invention chosen for illustration, body 22 takes the form of an elongated tube having an open lowermost end to present the air inlet opening but the breather may take various other shapes and forms so long as there is presented a chamber to guide air into the cable 10. Such open end of the tube 22 is flared outwardly to present an air scoop 24 and, except for a side opening 26 in the tube 22, it is otherwise imperforate because the tube 22 is provided with a closed uppermost end 28. Air inlet means may be formed in the cable 10 in any suitable manner for registration with the opening 26 to place the tube 22 into communication with the cable 10 and for purposes of illustration, there is shown a plurality of ports 30 formed in the cable 10 in Figs. 1 and 2.

The breather tube 22 is attached directly to the side of the cable 10 in any suitable manner and to this end, there is illustrated a number of spots of solder 32 at various locations throughout the length of the tube 22.

A restriction 34 having a perforation 36, takes the form of a plug mounted in the tube 22 just above the air scoop 24 which serves as a support for an elongated moisture-absorbing pad 38 made from wool or other highly absorbent material and extending upwardly at least as far as the side opening 26 of tube 22.

It is essential to prevent certain small, crawling insects from entering the tube 22 and, to this end, there is provided a perforated insect bar 40 in the tube 22 between scoop 24 and the restricted plug 34. The bar 40 may be made from any suitable noncorrosive screening and is preferably disposed at an angle as illustrated in Fig. 1 to prevent filming of any moisture collection thereon and to assure that such moisture will drain to the lowermost extremities of the bar 40 and drip therefrom. Bar 40 should be chosen so far as the size of the mesh thereof is concerned to particularly prevent entrance of certain small ants that habitually enter attached cable terminals and deposit eggs therewithin, requiring cleaning to avoid transmission failure.

In the event that it is desired to mount a breather of this type on a sleeve 20 disposed horizontally as shown in Fig. 6, it is but necessary to provide a tube 122 that is substantially L-shaped and terminating at its lowermost end in a flared air scoop 124. The tube 122 is made essentially as above described with respect to tube 22, and may be mounted similarly upon the sleeve 20. Inasmuch as the liner 18 is removed in making repairs and is normally not replaced when forming the sleeve 20, there will be less restriction to flow of air through the tube 122 and into the cable 10, and therefore, the restriction 34 may have a perforation 36 of correspondingly reduced cross-sectional area when utilized in the tube 122.

In this connection it is to be pointed out that most cables are disposed horizontally and that there are usually several sleeves 20 therealong. Thus, for the most part, the breather of this invention will be mounted in some satisfactory manner on horizontal sleeves.

I have found in actual use that through use of the breather tube hereof, difficulties resulting from suction of moisture by the cable through cracks and crevices can be virtually eliminated, particularly if a sufficient number of the breather tubes are utilized throughout the length thereof. Manifestly, the number of tubes 22 that are needed, or the spacing chosen therebetween, must be determined by existing conditions of temperature changes, barometric pressures, cable sizes and moisture conditions near the area of the cable.

The air inlet openings of the breathers herein illustrated are shown facing downwardly to permit their use out of doors and thereby avoid rainfall or other moisture from flowing thereinto. However, such precaution is unnecessary for inside use, and if other dispositions of the inlet are desired, it would be but necessary to provide a protecting baffle or hood to deflect such moisture flow.

Noteworthy also is the fact that, while the humidity of incoming air is lessened by the necessary function of absorbent means 38, the moisture so collected is continually removed and the pad 38 is automatically dried as the pressure increases in the cable to force dry air through the body 22 in the opposite direction.

The structure is easily and inexpensively manufactured and may be quickly applied wherever desired or needed since the maintenance crew need only provide an air inlet means such as at 30 in the cable 10, and apply the breather tube to the cable 10 by any suitable fastener.

Such changes and modifications in details of construction that fairly come within the spirit of this invention are contemplated hereby and it is, therefore, desired to be limited only by the scope of the appended claims.

Having thus described the invention what is claimed as new and desired to be secured by Letters Patent is:

1. In electrical cable means, a cable having a tubular sheath and a number of insulated, conductive wires therein; and structure for preventing shorts between insulated wires due to moisture drawn into said cable through cracks and crevices in said sheath as air pressure in the cable varies in response to temperature and/or barometric changes and creates a suction in the cable, said structure comprising an elongated, tubular body of relatively nominal length compared with the cable having an outlet opening communicating with the interior of said cable sheath and an air inlet opening communicating with the atmosphere, said body being adapted for mounting on the cable for support by the latter intermediate the extremities of the cable and in wholly suspended relationship from the latter; and moisture-absorbing means in the body within the path of travel of air drawn through the body and into the cable by the action of said suction.

2. A structure as specified by claim 1 wherein said body is flared outwardly at said inlet opening thereof to present an air scoop.

3. A structure as specified by claim 1 wherein is provided a perforated restriction in the body between said inlet opening and said moisture absorbing means for limiting the amount of air flowing into the cable.

4. A structure as specified by claim 1 wherein is provided a foraminous insect bar in the body adjacent said inlet opening, said bar being inclined for drainage of moisture collection therefrom.

5. In electrical cable means, a cable having a tubular sheath and a number of insulated, conductive wires therein; and structure for preventing shorts between said insulated wires due to moisture drawn into said cable through cracks and crevices in said sheath as air pressure in the cable varies in response to temperature and/or barometric changes and creates a suction in the cable, said structure comprising an elongated, tubular body having an air inlet opening and an outlet opening adjacent opposite ends thereof, the body being otherwise imperforate; means mounting the body on the side of the cable for support entirely by the latter, said cable sheath having air inlet means registering with said outlet opening for placing the body into communication with the interior of said cable sheath, the body being flared outwardly at said inlet opening to present an air scoop in communication with the atmosphere; a foraminous insect bar in the body adjacent said inlet opening, said bar being inclined for drainage of moisture collection therefrom; and an elongated, moisture-absorbing pad in the body between said bar and said outlet opening.

6. For use in combination with a telephone type cable having an elongated, generally cylindrical, tubular, outer sheath provided with a number of vent holes therein at one zone thereof and containing a plurality of insulated wires, a breathing device comprising an elongated, generally cylindrical, hollow body having an open end, a closed end and a side wall provided with an opening therein adjacent said closed end, the body being otherwise imperforate; means for mounting the body on the sheath for support of the device entirely by the sheath with the longitudinal axis of the body generally parallel to the longitudinal axis of the sheath and said opening facing the sheath opposite said holes; means for effecting a seal between the body and the sheath in circumscribing relationship to the opening and the holes, whereby the device may communicate with the interior of the sheath only through said opening and holes; an outwardly flared, air-scoop stretch on the body at the open end thereof; a foraminous insect-barring screen in the body adjacent said open end thereof; and a moisture absorbing pad in the body between the screen and the opening.

References Cited in the file of this patent

UNITED STATES PATENTS

| | | |
|---|---|---|
| 146,695 | Mackintosh | Jan. 20, 1874 |
| 1,198,400 | Anderson | Sept. 19, 1916 |
| 1,764,350 | Rodman | June 17, 1930 |
| 1,866,611 | Affel | July 12, 1932 |
| 2,359,959 | Anderson | Oct. 10, 1944 |
| 2,709,402 | Malm | May 31, 1955 |